United States Patent [19]

Joannes et al.

[11] Patent Number: 4,939,378
[45] Date of Patent: Jul. 3, 1990

[54] PROCESS FOR LENGTH MEASUREMENT BY MEANS OF A PHOTOSENSITIVE NETWORK CAMERA

[75] Inventors: René Joannes, Herve; Robert Malbrouck, Alleur, both of Belgium

[73] Assignee: Fabrique Nationale Herstal, Herstal, Belgium

[21] Appl. No.: 308,554

[22] Filed: Feb. 10, 1989

[30] Foreign Application Priority Data

Feb. 12, 1988 [BE] Belgium .................. 8800167

[51] Int. Cl.$^5$ ........................................ G01N 21/86
[52] U.S. Cl. ........................................ 250/560; 356/387
[58] Field of Search ............... 250/560, 561; 356/358, 356/369, 384, 398, 386, 387; 358/107

[56] References Cited

U.S. PATENT DOCUMENTS

| | | | |
|---|---|---|---|
| 4,351,437 | 9/1982 | Long | 250/560 |
| 4,596,037 | 6/1986 | Bouchard et al. | 356/384 |
| 4,650,335 | 3/1987 | Ito et al. | 356/398 |
| 4,818,110 | 4/1989 | Davidson | 356/358 |

FOREIGN PATENT DOCUMENTS 0094522 11/1983 European Pat. Off. .
0289084 2/1988 European Pat. Off. .

OTHER PUBLICATIONS

Patent Abstracts of Japan, vol. 10, No. 327, (P-513)(2383), 7 Nov., 1986, & JP, A, 61133806 (Tsubakimoto Chain Co., 21-Jun.-1986).

Primary Examiner—David C. Nelms
Attorney, Agent, or Firm—Foley & Lardner, Schwartz, Jeffery, Schwaab, Mack, Blumenthal & Evans

[57] ABSTRACT

Process for measuring lengths by means of a photosensitive network camera, characterized in that the process consists in integrating the video signals (V) over all or part of each of the scan lines (BI); following the evolution of the integral (I) during successive scans (BI) in the vicinity of the edges (9); and precisely locating the points in the integral curve (I) corresponding to the edges (9) in the image (8) of the object (1) to be measured.

14 Claims, 4 Drawing Sheets

PROCESS FOR LENGTH MEASUREMENT BY MEANS OF A PHOTOSENSITIVE NETWORK CAMERA

This invention concerns a process for length measurement by means of a photosensitive network camera.

In particular, this invention concerns a process which enables the location of the faces of an object to be determined from an image of the object produced on the photosensitive network detector, given sufficient illumination.

In another patent application submitted by the applicant on the same date, there is a description of a process for locating the edges of the image of an object observed by a photosensitive network camera, and thus to deduce its dimensions.

This process gives better repeatability and less sensitivity to lighting conditions and focus than do conventional processes which detect thresholds on the video signal thresholds or zero points on the analog double derivative. Like those processes, however, the present process is only usable if the image of the contour of the object is sufficiently sharp, so as to give a regular transition in the video signal. In order to achieve this, it is necessary for the object observed to be located in the focal plane of the camera.

In the case where, using the process of the abovementioned patent application submitted by the applicant, it is desired to locate the edges of the image of an object consisting of two cylindrical parts of different diameters separated by a face perpendicular to the axis of the object, the diameters of the object can be measured with precision since the generatrixes which delimit the profile of the cylindrical parts are located in the focal plane. By contrast, the image of the face of the object observed in profile by the camera appears fuzzy. The area of fuzziness extends over several scan lines on either side of actual position of the sides. Moreover, the video signal is disturbed in this area by parasitic light reflectinos on the face, so that the position of the faces in the image cannot be determined precisely by the process mentioned above.

The main aim of the invention is to provide a method of overcoming the abovementioned disadvantages, thus enabling the position of the faces parallel to the axis of vision of the camera to be precisely determined in the image.

In order to achieve this, the process according to the invention consists in integrating the video signals over all or part of the scan lines; following the evolution of the integral during successive scans in the vicinity of the face to be located, and, in the integral curve, precisely determining the position of the points corresponding to the faces in the image of the object to be measured. In order to explain the characteristics of the invention, the following embodiments of the process according to the invention are described below, by way of example only and without being limitative in any way, with reference to the attached drawings, where:

Figure 1:
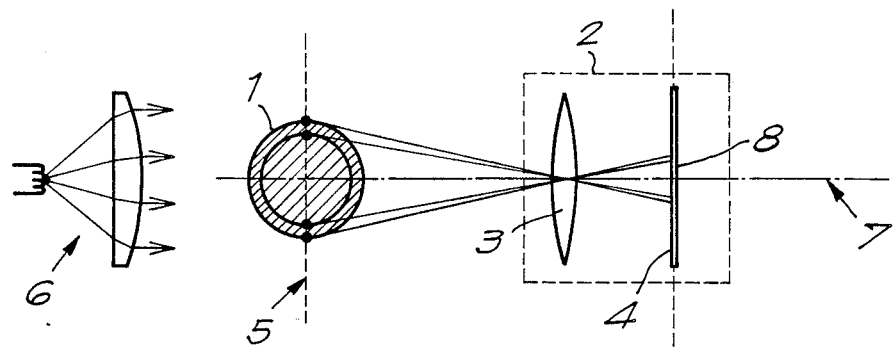
FIG. 1 represents the principle of measurement according to the invention.

As shown in FIG. 1, an object to be measured 1, with axial revolution, is placed in front of camera 2 made up of a lens 3 and a photosensitive network detector 4. The axis of the object to be measured 1 is positioned in the focal plane 5 of the camera 2 such that the image of the object to be measured 1 is correctly focussed on the photosensitive surface of the detector 4.

The object to be measured 1 is lit by a collimated light source 6 parallel to the optical axis 7 of the camera 2 and situated behind the object 1 with respect to the camera, so that not the image of the object 1 but the image 8 of its shadow is formed on the detector 4.

Figure 2:
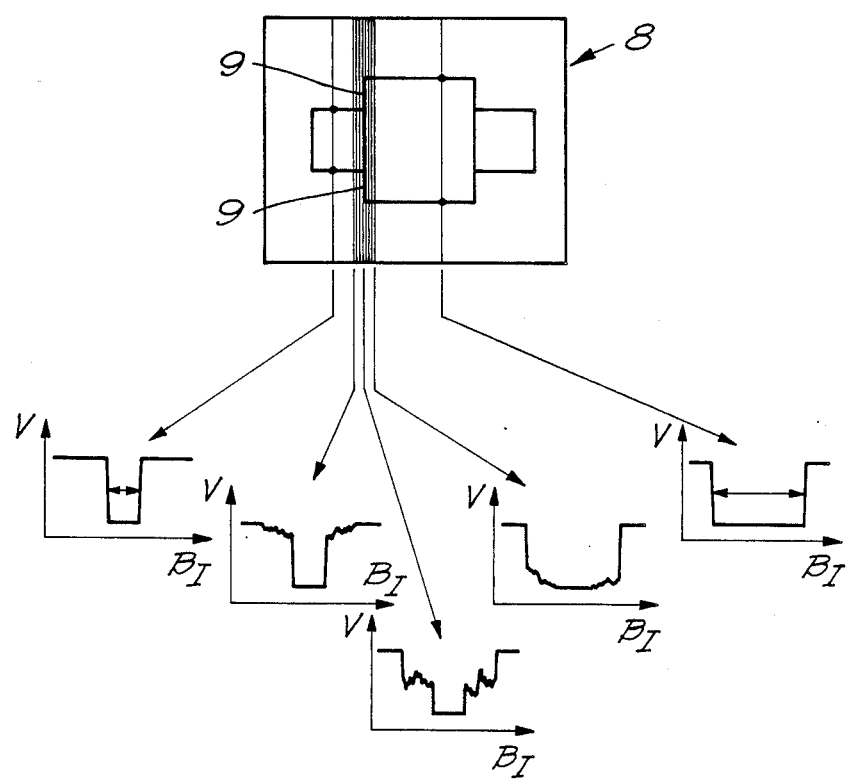
FIG. 2 represents the video signals corresponding to the scanning lines B in the vicinity of the face.

The image 8 observed by the photosensitive network 4 is scanned line by line by means of electronic circuits not shown in FIG. 1. The video signals V thus obtained, in particular the video signals V corresponding to the scan lines BI in the vicinity of the face 9 are disturbed, for the reasons explained above, as shown in FIG. 2, and thus do not directly provide any useful information which would enable the position of the face 9 to be delimited with precision.

Figure 3:
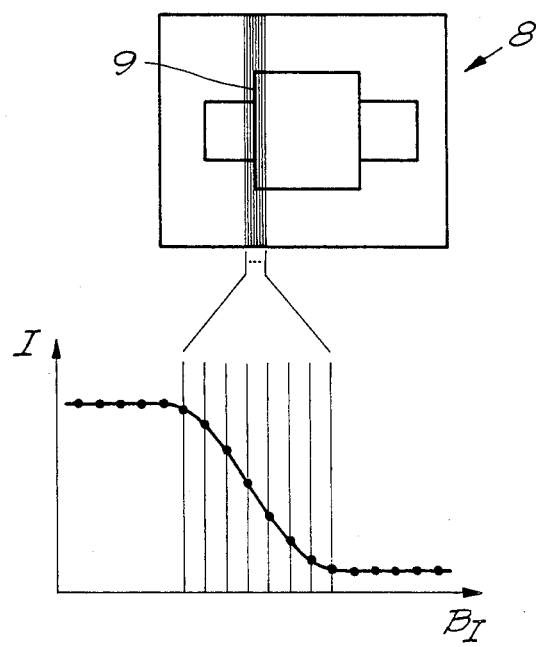
FIG. 3 shows an integral curve.

The process according to the invention, which overcomes this problem, consists essentially in integrating the video signal V for each of the scan lines BI; following the evolution of the integral I during successive scans BI in the vicinity of the face 9, and precisely locating, in the integral curve I, the points corresponding to the edges in the image 8 of the object to be measured 1. The value of the integral I represents the total quantity of light received by the camera 2 along the scan line BI, and varies at the position of the face 9, corresponding to a sudden change in the profile being observed. In actual fact, the variation in the integral I at the position of the face 9 is not sudden but follows a regular curve as shown in FIG. 3 as a result of the fuzziness around the face 9.

Precise location of the face 9 along this curve can be achieved using various criteria, whose choice will be depend on the type of illumination 6 used and the characteristics of the object 1.

One criterion consists in determining the point of inflection of the curve.

Figure 4:
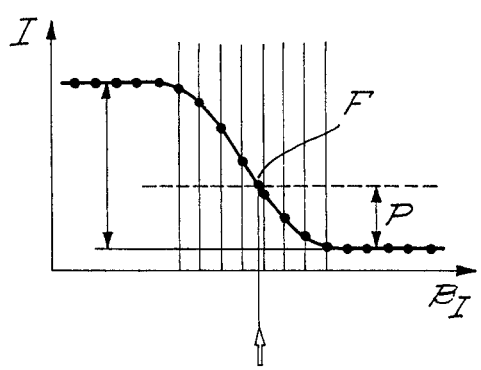
FIG. 4 represents a criterion for locating the face.

Another consists in detecting the point F at which the curve I reaches a fixed percentage P of its total variation, as shown in FIG. 4. This percentage P can be determined experimentally during calibration of the instrument.

Yet another criterion consists in differentiating the integral signal I twice and locating the particular points characteristic of the faces 9 on the curve thus obtained.

A first differentiation D1 is carried out by calculating the successive differences in the values of the integral I obtained on each scan BI by the camera 2. The second derivative D2 is obtained by successive differencing of the values obtained by calculating the first derivative D1.

Figure 5A:
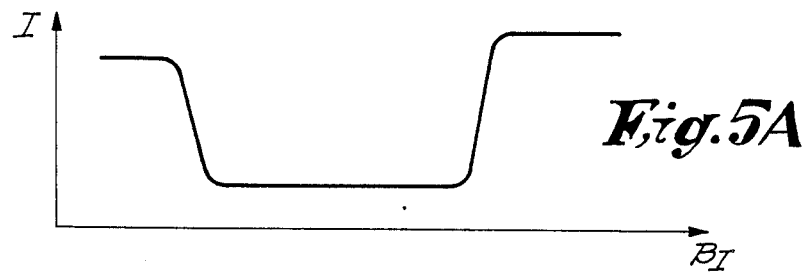
FIG. 5, 5B, 5C, 6A, 6B, 7A, 7B and 7C represent other criteria for locating the face.
Figure 5B:
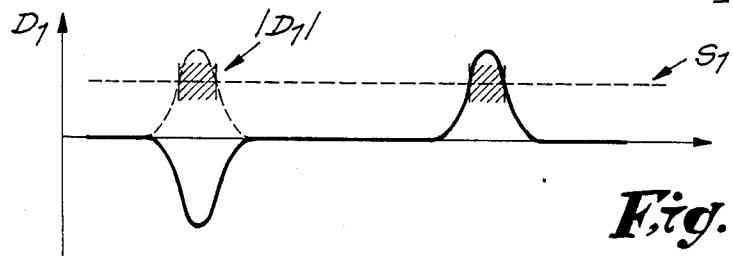
Figure 5C:
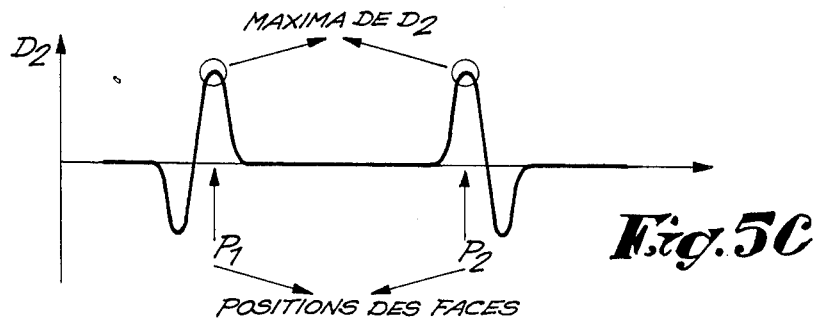

As shown in FIG. 5, the position of the faces 9 is determined by locating the positive maxima P1 and P2 in the curve of the second derivative D2 of the integral curve I, i.e. the points of maximum curvature in a particular direction.

In order to eliminate parasitic detections which could result from the presence of noise in the second derivative signal D2, the areas in which detection is carried out are limited to those places where the absolute value of the first derivative D1 is greater than a threshold S1 determined experimentally.

Figure 6A:
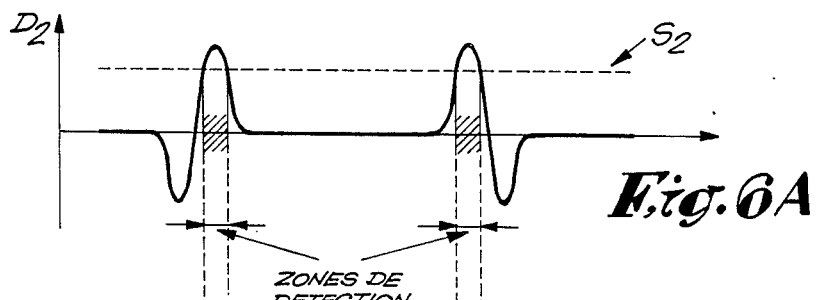
Figure 6B:
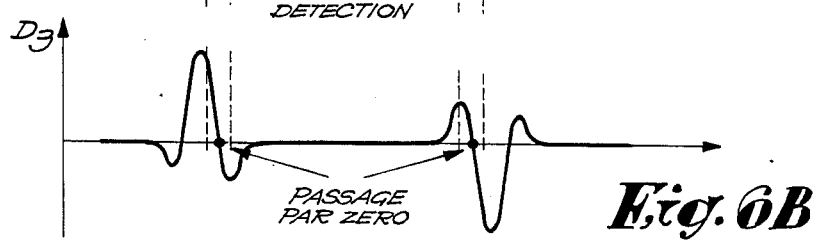

The process of locating the faces 9 by detecting the position of the maxima P1 and P2 of the second derivative curve D2 can be further refined by, instead of locating the maxima P1 and P2, locating the zero points of the curve D3, namely the curve of the derivative of the second derivative D2, in those areas in which the value of curve of the second derivative D2 is greater than a threshold S2 determined experimentally, as shown in FIG. 6.

Interpolation procedures can also be applied to increase the resolution, which is initially quantified by the scan time for each scan BI by the camera 2.

Another criterion for locating the faces 9 by means of the integral curve I recorded during successive scans BI by the camera 2 consists in locating the points corresponding to the maxima of the correlation function of the second derivative D2 of the integral curve I, with a filter C which is determined empirically and which covers the deformations due to focussing faults.

The filter is calculated empirically by recording a large number of integral curves I for different kinds of objects 1; calculating the second derivative D2 of the curves thus obtained and extracting the average representative curve of the second derivative D2; sampling this second derivative curve D2 at a rate corresponding to the speeds of translation obtained in practice and apodising the filter C so as to reinforce its effect in the vicinity of the positive maxima.

The form of the filter C thus imposed will vary depending on the type of edge of the integral curve. In order to avoid having to calculate two correlation functions in parallel, each corresponding to a particular edge of the integral curve I, the procedure adopted consists of automatically selecting the filter C to correspond to the type of edge of the curve being sought in the area for which the correlation function is being calculated.

This is done by locally determining the sign of the first derivative D1 of the integral signal I and obtaining the products of convolution necessary for calculating the correlation function, using the corresponding filter C.

Figure 7A:
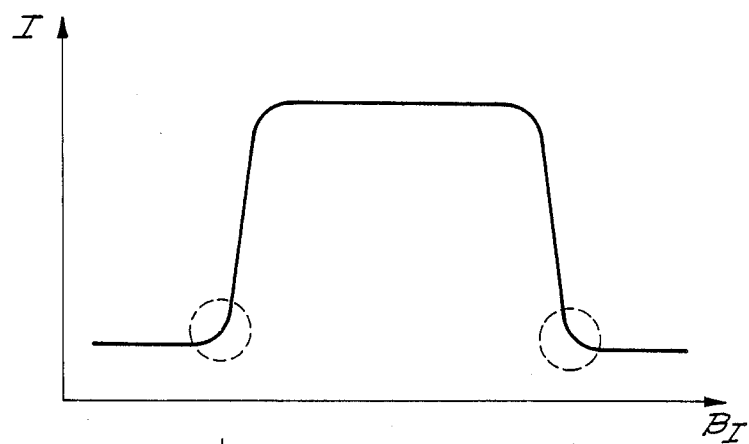
Figure 7B:
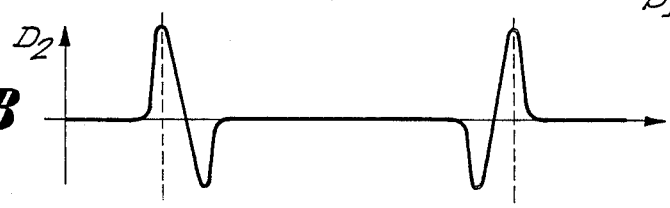
Figure 7C:
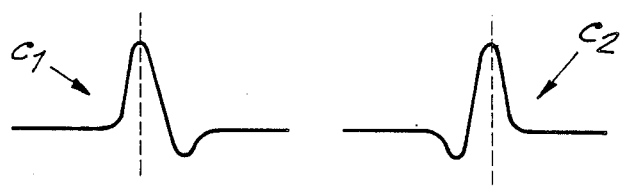

The criterion described above is represented by FIG. 7, in which C1 and C2 are the filters for the leading and trailing edges respectively.

Integrating the video signal V for each scan BI can be carried out over the whole scan BI or over one or more parts of the scan BI, and can be done using conventional techniques, either on the analog video signal or after digitization of the signal.

Figure 8:
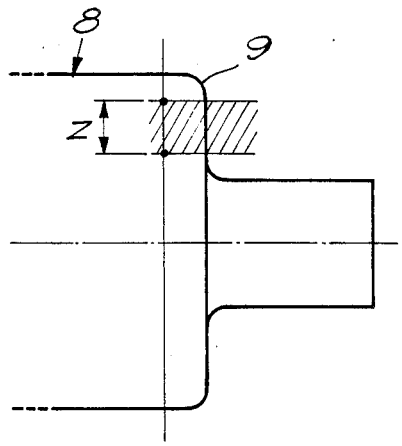
FIG. 8 represents a particular problem of measurement in which the video signal is partially integrated.

Integrating the video signal V after digitization is particularly advantageous when using a camera 2 with photosensitive cells 4. Each pixel or image element is digitied at the clock frequency of the network 4, and the integral I is obtained by summing the digital values of successive pixels. Partial integration of a section Z of the video signal, as shown in FIG. 8 for a particular problem of measurement, is then especially easy, since by counting the clock pulses which control scanning of the network 4 it is possible to start summing at a particular pixel, and to terminate after the desired number of pixels.

When a matrix network is used, integration is carried out on all or part of the signal obtained by scanning each successive line of the network 4.

When a linear network is used in conjunction with a displacement device which carries the object to be measured past the sensor, the integral value obtained on each scan of the photosensitive line is taken together with the corresponding position of the object in order to obtain the integral curve, to which one of the criteria mentioned above is applied in order to locate the faces of the object.

Clearly, various modifications can be made to the example described above while still remaining within the scope of the invention.

We claim:

1. Method for measuring lengths of an object from a negative of the image of said object detected by a photosensitive network camera comprising:
   projecting said negative on said photosensitive network detector;
   scanning said negative to obtain scan lines;
   generating video signals for each of said scan lines;
   integrating said video signals over all or part of each of said scan lines to produce an integral curve;
   following the evolution of said integral curve during successive scans in the vicinity of the edges of said negative; and
   locating points in said integral curve corresponding to said edges in said negative.

2. Method according to claim 1, wherein integrating the video signal of each of the said lines is carried out using an analog video signal.

3. Method according to claim 1, wherein integrating said video signal of each of the scan lines is carried out after the video signal has been digitized.

4. Method according to claim 3, wherrein said integration comprises summing the digital values of the pixels or successive image elements of said digitized video signal.

5. Method according to claim 1, wherein locating points corresponding to the edges of said negative of the image of the object comprises determining the point of inflection of said integral curve made up of the values of the integral during successive scans.

6. Method according to claim 1, wherein locating points corresponding to the edges in said negative of the image of the object is achieved by detecting the point at which the integral curve made up of successive values of the integral obtained during successive scans reaches a fixed percentage of the total variation (A).

7. Method according to claim 6, wherein said percentage is determined experimentally during calibration of the instrument.

8. Method according to claim 1, wherein locating points corresponding to said edges in the negative of the image of the object comprises differentiating the integral curve twice and locating the points corresponding to the maxima of the second derivative in the areas where the absolute value of the first derivative is greater than a threshold set experimentally.

9. Method according to claim 1, wherein locating points corresponding to said edges in the negative of the image of the object comprises locating the points corresponding to the maxima of the correlation function of the second derivative of the integral curve; using a filter determined empirically; and covering the deformations caused by focussing faults.

10. Method according to claim 9, wherein said filter is determined empirically by analysing a large number of typical integral curves, taking into account the effects of fuzziness.

11. Method according to claim 9, wherein said filter is apodised so as to amplify the sensitivity of the correlation test in the vicinity of the maxima of the second derivative.

12. Method according to claim 9, wherein said filter is automatically selected according to the type of edge of said integral curve.

13. Method according to claimm 1, wherein the negative of the image to be analysed is obtained on a matrix network and the integration is carried out on all or part of the video signals obtained by scanning successive lines of the network.

14. Method according to claim 1, wherein the negative of the image to be analysed is obtained on a linear network used in conjunction with a displacement device which moves the object to be measured in front of the sensor, the integral value obtained on each successive scan of the photosensitive line is combined with measurement of the corresponding position of the object in order to obtain the curve.

* * * * *